US008955077B1

(12) United States Patent
Hird

(10) Patent No.: US 8,955,077 B1
(45) Date of Patent: *Feb. 10, 2015

(54) SERVER-TOKEN LOCKSTEP SYSTEMS AND METHODS

(71) Applicant: CA, Inc., Islandia, NY (US)

(72) Inventor: Geoffrey Hird, Cupertino, CA (US)

(73) Assignee: CA, Inc., New York, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/919,789

(22) Filed: Jun. 17, 2013

Related U.S. Application Data

(63) Continuation of application No. 11/187,602, filed on Jul. 21, 2005, now Pat. No. 8,490,169.

(51) Int. Cl.
*H04L 9/32* (2006.01)
*H04L 29/06* (2006.01)
*G06F 12/14* (2006.01)
*G06F 11/30* (2006.01)
*H04L 9/00* (2006.01)

(52) U.S. Cl.
CPC ............. *H04L 63/0884* (2013.01); *H04L 9/32* (2013.01); *G06F 12/14* (2013.01); *G06F 11/30* (2013.01); *H04L 9/00* (2013.01)
USPC ............................ 726/7; 726/2; 726/4; 726/9

(58) Field of Classification Search
CPC ............. H04L 9/32; H04L 9/00; G06F 11/30; G06F 12/14
USPC .................................................. 726/7, 2, 4, 9
See application file for complete search history.

(56) References Cited

U.S. PATENT DOCUMENTS 6,910,136 B1  6/2005  Wasserman et al.
7,020,645 B2  3/2006  Bisbee et al.

OTHER PUBLICATIONS

CRYTPOcard DoS issue, Chongo (113939) Nov. 3, 2004, printed from website on Sep. 14, 2005 (3 pages) http://ask.slashdot.org/comments.pl?sid=23189&cid=2515877.
RSA SecurID® Authentication, A Better Value for a Better ROI, Copyright 2001 (12 pages) http://www.infosysinc.com/MRC/content/IT%20Security/RSA/SecurIDROI.pdf.
Office Action dated Jan. 13, 2009, U.S. Appl. No. 11/187,602, filed Jul. 21, 2005, 21 pages.
Response to Office Action dated Apr. 13, 2009, U.S. Appl. No. 11/187,602, filed Jul. 21, 2005, 9 pages.
Office Action dated Jun. 19, 2009, U.S. Appl. No. 11/187,602, filed Jul. 21, 2005, 20 pages.
Notice of Allowance and Fee(s) Due dated Mar. 20, 2013, U.S. Appl. No. 11/187,602, filed Jul. 21, 2005, 10 pages.

*Primary Examiner* — Jeffrey Pwu
*Assistant Examiner* — Samuel Ambaye
(74) *Attorney, Agent, or Firm* — Vierra Magen Marcus LLP

(57) ABSTRACT

A method of authenticating a client to a service via a network includes retrieving a client ID and a lockstep code from a token interfaced with a client device, sending the client ID and the lockstep code to an authentication server as part of a verification request, at the authentication server, comparing the lockstep code to a confirmation lockstep code relating to the client ID, based on the comparison, sending an authentication message from the authentication server, at the authentication server, generating a new confirmation lockstep code, sending the new confirmation lockstep code to the client device, and updating the lockstep code of the token to an updated lockstep code that matches the new confirmation lockstep code.

20 Claims, 5 Drawing Sheets

SERVER-TOKEN LOCKSTEP SYSTEMS AND METHODS

CLAIM OF PRIORITY

This application is a continuation of U.S. patent application Ser. No. 11/187,602, entitled "SERVER-TOKEN LOCKSTEP SYSTEMS AND METHODS," filed Jul. 21, 2005, published as US2007/0022473 on Jan. 25, 2007 and issued as U.S. Pat. No. 8,490,169 on Jul. 16, 2013, which is incorporated herein by reference in its entirety.

Embodiments of the invention relate generally to Internet security. More specifically, embodiments of the invention relate to identity verification systems and methods.

BACKGROUND OF THE INVENTION

As Internet usage becomes more popular, increasing numbers of users desire to conduct secure transactions, access sensitive information, and the like, using the Internet. At the same time, however, identity theft and fraudulent online transactions are increasing at alarming rates. Many solutions have been implemented to counter the growing incidence of online fraud, including the use of tokens in combination with passwords to provide two-factor authentication. One such solution, known as SecureID, is provided by RSA Security. To defeat such a solution, an attacker must obtain both the password and the token in order to masquerade as the owner. Such solutions, however, are cumbersome and expensive since tamper-resistant hardware tokens have to be built, personalized, distributed, and protected.

Other solutions employ "lockstep" mechanisms in which both tokens and an authentication server increment a lockstep code, which the token must provide for successful identity verification. Such solutions are less than ideal since the lockstep code is known to fall within a fairly narrow range, making guessing it rather easy for an intruder. More importantly, however, once an intruder knows the correct lockstep code, generating subsequent lockstep codes is trivial.

For at least the foregoing reasons, improved solutions are needed.

BRIEF SUMMARY OF THE INVENTION

Embodiments of the invention thus provide a method of authenticating a client to a service via a network. The method includes retrieving a client ID and a lockstep code from a token interfaced with a client device, sending the client ID and the lockstep code to an authentication server as part of a verification request, at the authentication server, comparing the lockstep code to a confirmation lockstep code relating to the client ID, based on the comparison, sending an authentication message from the authentication server, at the authentication server, generating a new confirmation lockstep code, sending the new confirmation lockstep code to the client device, and updating the lockstep code of the token to an updated lockstep code that matches the new confirmation lockstep code.

In some embodiments, the lockstep code of the token includes a first lockstep code, in which case the method may include thereafter, at the authentication server, receiving a verification request from a different client. The verification request includes the client ID and the first lockstep code. The method also includes, at the authentication server, comparing the first lockstep code to the new confirmation lockstep code relating to the client ID and, based on the comparison, sending an authentication message from the authentication server. The authentication message indicates that the comparison failed. The method may include, at the authentication server, updating a stored confirmation lockstep code to match the new confirmation lockstep code. The step of updating the stored confirmation lockstep code may take place in time prior to the step of sending an authentication message from the authentication server. Sending an authentication message from the authentication server may include sending a message that indicates that the comparison failed. Sending an authentication message from the authentication server may include sending an approval message indicating that the comparison passed. The token may be a physical device. The physical device may be a device adapted to plug into a USB port. The token may be software installed on the client device. The software may be a plug-in associated with a browser. The token may be a cookie associated with a web browser. Updating the stored lockstep code may include creating a hash of one or more elements. Creating a hash of one or more elements may include creating a hash of one or more elements including the client ID, a time stamp, and a secret word of the client. Generating a new confirmation lockstep code may include randomly generating a new confirmation lockstep code. A length of the lockstep code may be fixed or may change dynamically.

In still other embodiments a writable identity verification token includes means for storing a client ID and a lockstep code, means for interfacing with a client computing device to thereby transmit the client ID and the lockstep code, via the client computing device, to an authentication server, and means for updating the lockstep code to an updated lockstep code received from the authentication server. The token may be a software token. The software token may be a plug-in associated with a browser. The token may be a cookie associated with a browser. The token may be a hardware token. The means for interfacing with a client computing device may be a USB plug.

In still other embodiments, an authentication server includes means for storing a plurality of client IDs, means for generating a confirmation lockstep code associated with each client ID, means for comparing a lockstep code associated with a client ID in a verification request to a confirmation lockstep code associated with the client ID, means for providing an authentication message based on the comparison, and means for generating a new confirmation lockstep code. The authentication server may include means for storing a confirmation lockstep code. The authentication server also may include means for generating a confirmation lockstep code that includes means for generating a confirmation lockstep code by creating a hash of one or more elements. The means for creating a hash of one or more elements may include means for creating a hash of one or more elements including the client ID, a time stamp, and a secret word of the client. The means for generating a confirmation lockstep code may include means for randomly generating a confirmation lockstep code. The means for generating a confirmation lockstep code may include means for maintaining lockstep codes to be a fixed length. The means for generating a confirmation lockstep code may include means for dynamically changing the length of lockstep codes.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In a typical authenticated transaction, three parties are involved: a client, a service, and an authentication provider. The client is any individual or proxy that desires to access a service for which authentication is necessary. The authentication provider helps the client by verifying the credentials of the client to the service. As an example, the client may be any individual with a credit card account. The service could be any online merchant, and the authentication provider could be, for example, a bank that issued the client's credit card. Whenever the client wants to purchase goods from the service, the client or the service approaches the authentication provider for authentication. The client provides all the necessary credentials, and, if the authentication provider is satisfied with the credentials provided, the authentication provider issues an approval message. Upon getting the approval message, the service permits the requested transaction. If the service does not receive an approval message, the service may abort the requested transaction.

According to embodiments of the invention, the credentials provided by the client include an identifier and a lockstep code. The identifier and the lockstep code are stored on a token in the possession of the client. The token may be hardware or software. Once a client's identity is verified to a service, the authentication provider updates the lockstep code and sends the updated lockstep code to the client. The client stores the updated lockstep code on the token.

If the client's token is stolen, the client may immediately report the stolen token to the authentication provider, after which the token is disabled. If, however, the token is cloned, one of two situations arise. In the first instance, the client uses the original token and completes an identity verification process, after which all token clones are immediately unusable since the lockstep codes on the clones will be out of sync with the authentication provider. The original token, in the possession of the client, remains usable. In the second instance, usage of any cloned token immediately renders all other tokens, including the original token, useless. The client will discover that his token is useless when he next tries to complete a transaction requiring authentication, after which he can request that the token be disabled or reset.

According to most embodiments, any time a client becomes concerned that his token may be compromised, he may assuage his concerns by attempting to access a service that requires authentication. If successful, the client obtains the peace of mind that no one has accessed a service that requires his token. Further, the client enjoys the satisfaction of knowing that his action has rendered useless all clones of his token.

Figure 1:
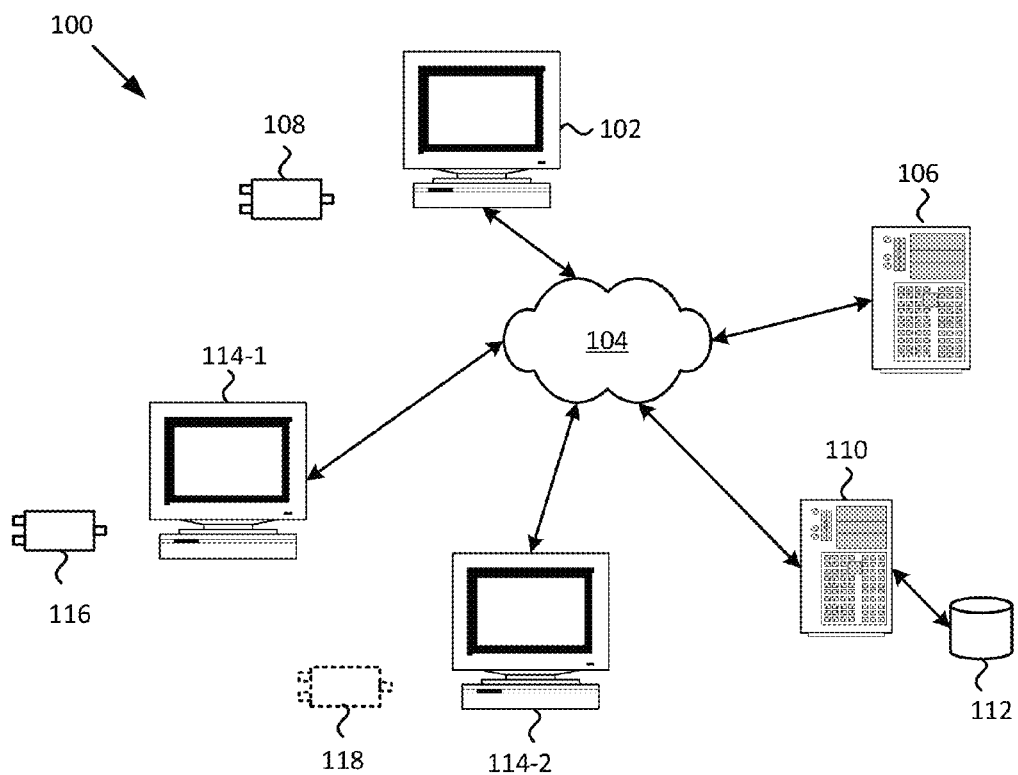
FIG. 1 illustrates a networking environment in which embodiments of the invention may be employed.

Having described embodiments of the invention generally, attention is directed to FIG. 1, which illustrates an exemplary network environment 100 in which embodiments of the invention may be deployed. Those skilled in the art will appreciate that the network environment 100 is merely exemplary of a number of possible embodiments. According to embodiments of the invention, clients use client devices 102 to communicate via a network 104 with services 106. The client devices 102 may be any of a variety of computing devices including personal computers, laptop computers, desktop computers, workstations, personal digital assistants (PDAs), and/or the like. The network 104 may be any of a variety of networks and may include wireless and wired connections, a variety of network components, and the like. The network 104 may be, for example, the Internet. Services 106 may be any of a variety of services clients desire to interact with via the network 104, such as online banking services, financial services, e-commerce merchants, and the like.

According to embodiments of the invention, client devices 102 require identity verification to access the services 106. Identity verification is accomplished by interfacing a token 108 with a client device 102. On the token 108, a client ID and a lockstep code are stored. When a client device 102 attempts to access a service 106, either the client device 102 or the service 106 sends a verification request to an authentication server 110. The identity verification request includes the client ID and the lockstep code. Associated with the authentication server 110 is a data storage arrangement 112 at which client IDs and, in some embodiments, confirmation lockstep codes are stored. In other embodiments, the authentication server 110 maintains enough information to generate a confirmation lockstep code in real time. The authentication server 110 locates the client ID at the storage arrangement 112 and compares the lockstep code in the identity verification request to the stored/generated confirmation lockstep code. If the lockstep code in the identity verification request matches the confirmation lockstep code at the authentication server 110, the authentication server 110 generates a new confirmation lockstep code and sends a verification message to the service 106. The authentication server 110 then sends the new confirmation lockstep code to the client device 102 where the lockstep code stored on the client's token 108 is updated to match the new confirmation lockstep code.

The token 108 may be any of a variety of devices and/or software. For example, the token 108 may be a USB token that the user plugs into a USB port of the client device 102. In such embodiments the token 108 is portable and the user is able to use the token at a number of different client devices. In some embodiments, however, the token 108 is software installed on the specific client device 102. The software may be a plug-in to a web browser or something similar. In some embodiments, the token is a cookie associated with a web browser.

The network environment 100 also includes intruders 114, which may attempt to gain access to the service 106 using a stolen token 116 or a cloned token 118. As will be described in more detail hereinafter, embodiments of the invention may be used to prevent or limit an intruder's ability to access a service.

Figure 2:
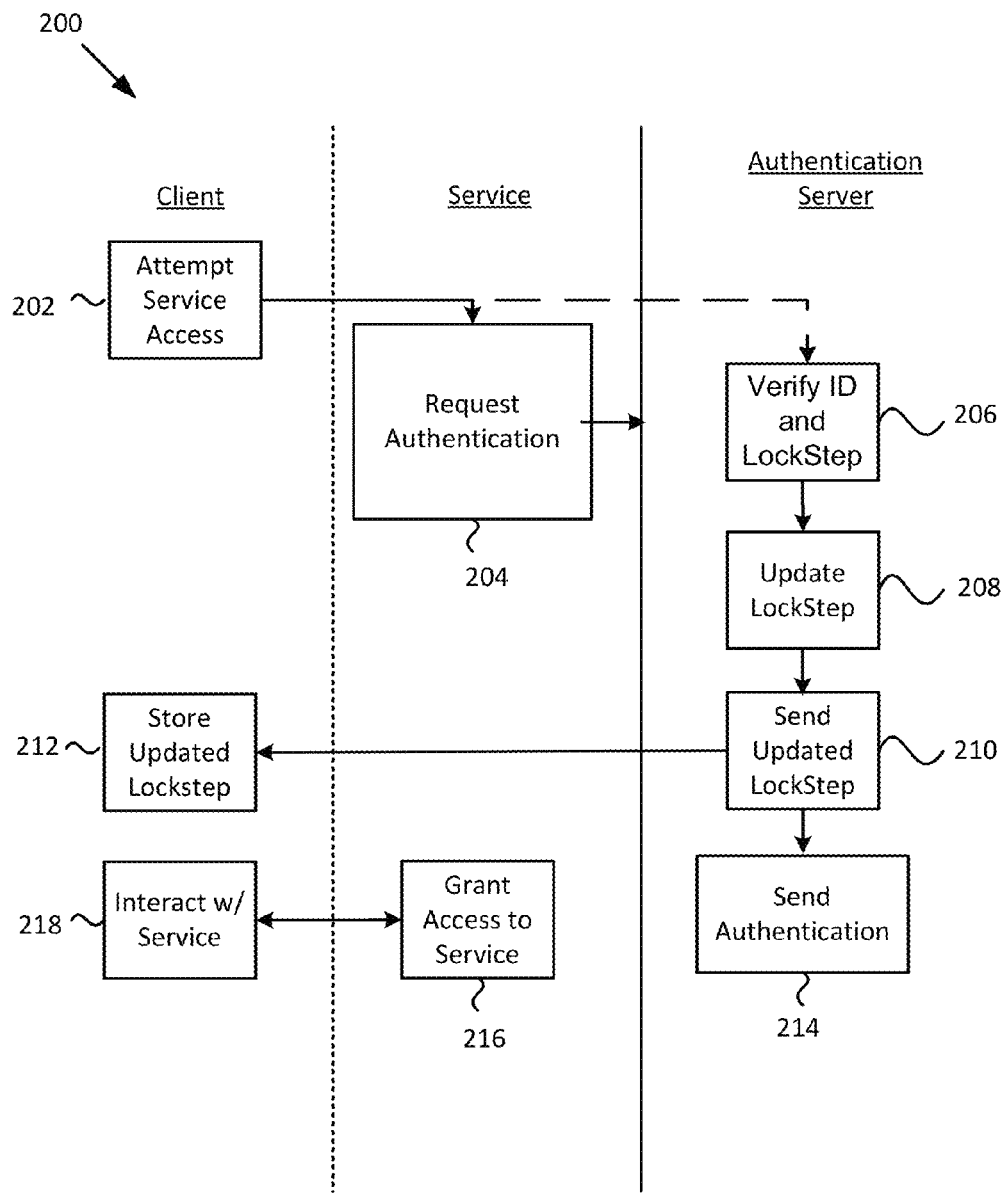
FIG. 2 illustrates a first exemplary method according to embodiments of the invention, which method may be employed in the environment of FIG. 1.

Having described an environment in which embodiments of the invention may be deployed, attention is directed to FIG. 2, which illustrates an exemplary method 200 according to embodiments of the invention. The method 200 may be deployed in the network environment 100 of FIG. 1 or other appropriate environment. Those skilled in the art will appreciate that other methods according to other embodiments may have more, fewer, or different steps than those illustrated and described herein. Further, other exemplary embodiments may traverse the steps illustrated and described herein in different orders.

The method 200 begins at block 202 when a client attempts to access a service. The client and service may be the client 102 and the service 106 from FIG. 1. At block 204, the service requests authentication of the client from an authentication provider, which may be, for example, the authentication server 110 of FIG. 1. Alternatively, the client, as part of the request for service, may transmit the authentication request itself to the authentication server. In either case, the authentication request includes a client ID and a lockstep code, both of which are stored on a token in the possession of the client and/or stored on a client computing device. As previously described, the token may be either a physical device or software.

At block 206, the authentication server uses the client ID in the authentication request to locate a record relating to the client. The record includes both the client ID and a confirmation lockstep code for the client (or sufficient information to generate the confirmation lockstep code). If the lockstep code in the authentication request matches the confirmation lockstep code, the authentication server updates the lockstep code at block 208 (i.e., generates a new confirmation lockstep code) and sends the new confirmation lockstep code to the client at block 210. At block 212 the lockstep code stored at the client's token is updated to match the new confirmation lockstep code.

Each confirmation lockstep code may be generated using any of a variety of techniques. For example, confirmation lockstep codes may be generated randomly. The lockstep code could be a sequence number, a timestamp signed by the authentication server, a hash of a number of items such as client ID, timestamp, mother's maiden name, and/or the like. The length of the lockstep code could be fixed at, for example, 20 bytes or so, or could change dynamically. In some embodiments it is not strictly necessary for the authenticating server to store the exact lockstep code, provided it has a way of testing whether the submitted lockstep code is the correct current lockstep code.

It should be noted that, when the lockstep code is updated on the client and server, it is desirable to be an atomic commit on both. Many events, however, can cause this to fail. For example, a network failure, computer crash, premature token removal, and/or the like may prevent the new confirmation lockstep code from being stored on the client's token. An impatient user might click on "Submit" multiple times before the transaction is finished. Or the client device may be unable to write to the token, perhaps owing to permissions or the like. To account for this, any of a variety of standard techniques may be employed to ensure atomicity, many of which are known in the art. In any event it is preferable to deny the client service rather than to tolerate re-use of an old lockstep code or avoid a lockstep code check. This is accomplished by storing/generating the new confirmation lockstep code at the authentication server prior to approving the client.

Continuing with the discussion of FIG. 2, at block 214 the authentication server sends an approval message to the service. The service grants the client access at block 216 and the client begins interacting with the service at block 218.

Figure 3:
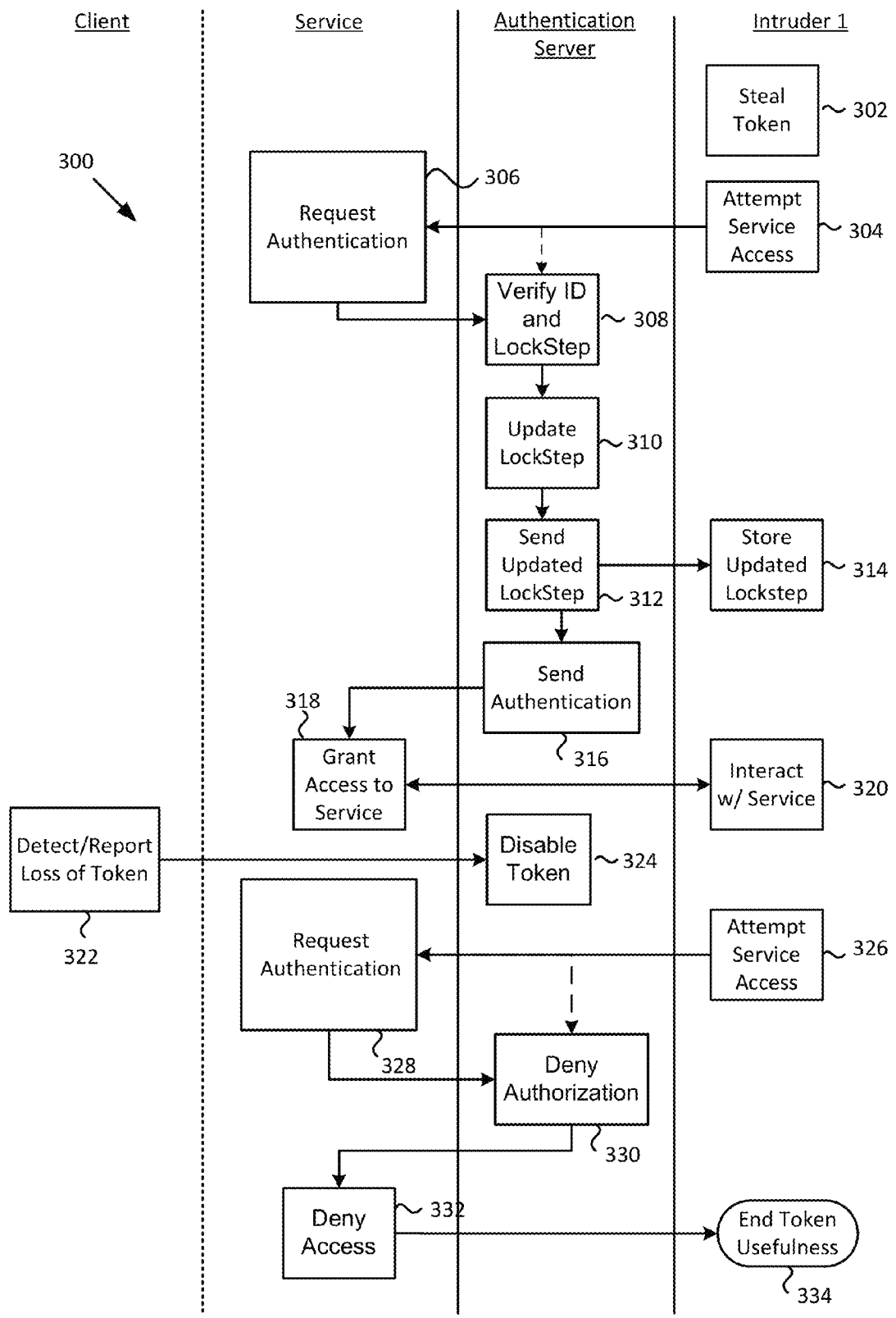
FIG. 3 illustrates a second exemplary method according to embodiments of the invention, which method may be employed in the environment of FIG. 1. The method of FIG. 3 relates to a stolen token.

FIG. 3 illustrates a second exemplary method 300 according to embodiments of the invention. In this exemplary method, however, an intruder has stolen the client's token. This is illustrated as block 302. Hence, the intruder is positioned as the intruder 114-1 of FIG. 1 using the stolen token 116.

It should be apparent that the client may immediately realize that his token is missing, in which case the client may immediately report the token as stolen to the service. Doing so renders the stolen token unusable. For purposes of illustration, the ensuing description assumes that the client does not realize his token is stolen until the intruder has accessed the service using it at least once.

Continuing with the description, at block 304 the intruder, using the client's token, attempts to access the service. The service sends an authentication request to the authentication server at block 306. At block 308 the authentication server verifies the client ID and lockstep code included in the authentication request. At block 310 the authentication server updates the lockstep code then sends the new confirmation lockstep code to the intruder at block 312. The intruder stores the new confirmation lockstep code on the token at block 314. At block 316 the authentication server sends an authentication approval message to the service. Thereafter, the service grants access to the intruder at block 318, and the intruder interacts with the service beginning at block 320.

As previously stated, although the intruder has gained access to the service using the client's token in this example, in other examples, the client may notice the absence of the token in time to disable it before the intruder is able to gain access. For purposes of this example, however, we are assuming that the client does not detect the absence of the token until after the intruder has gained access to the service the first time. Hence, at block 322 a client detects that his token is missing and reports the token as lost or stolen to the authentication server. At block 324 the authentication server disables the token. Thereafter, when the intruder attempts to access the service at block 326, the service requests authentication at block 328. The authentication server denies authorization at block 330 and sends such a message to the service. The service denies access to the intruder at block 332, which ends the stolen token's usefulness as illustrated at block 334.

It is also possible for the client's token to be cloned. This situation is somewhat different from the previously-described situation in which the client's token was stolen, since the client does not enjoy the possibility of noticing the token's absence in time to report it stolen before the intruder is able to use it. Conversely, in this situation the client may use the original token before the intruder does, thus rendering all clones useless. Hence, FIGS. 4A and 4B illustrate exemplary methods relating to cloned tokens.

Figure 4A:
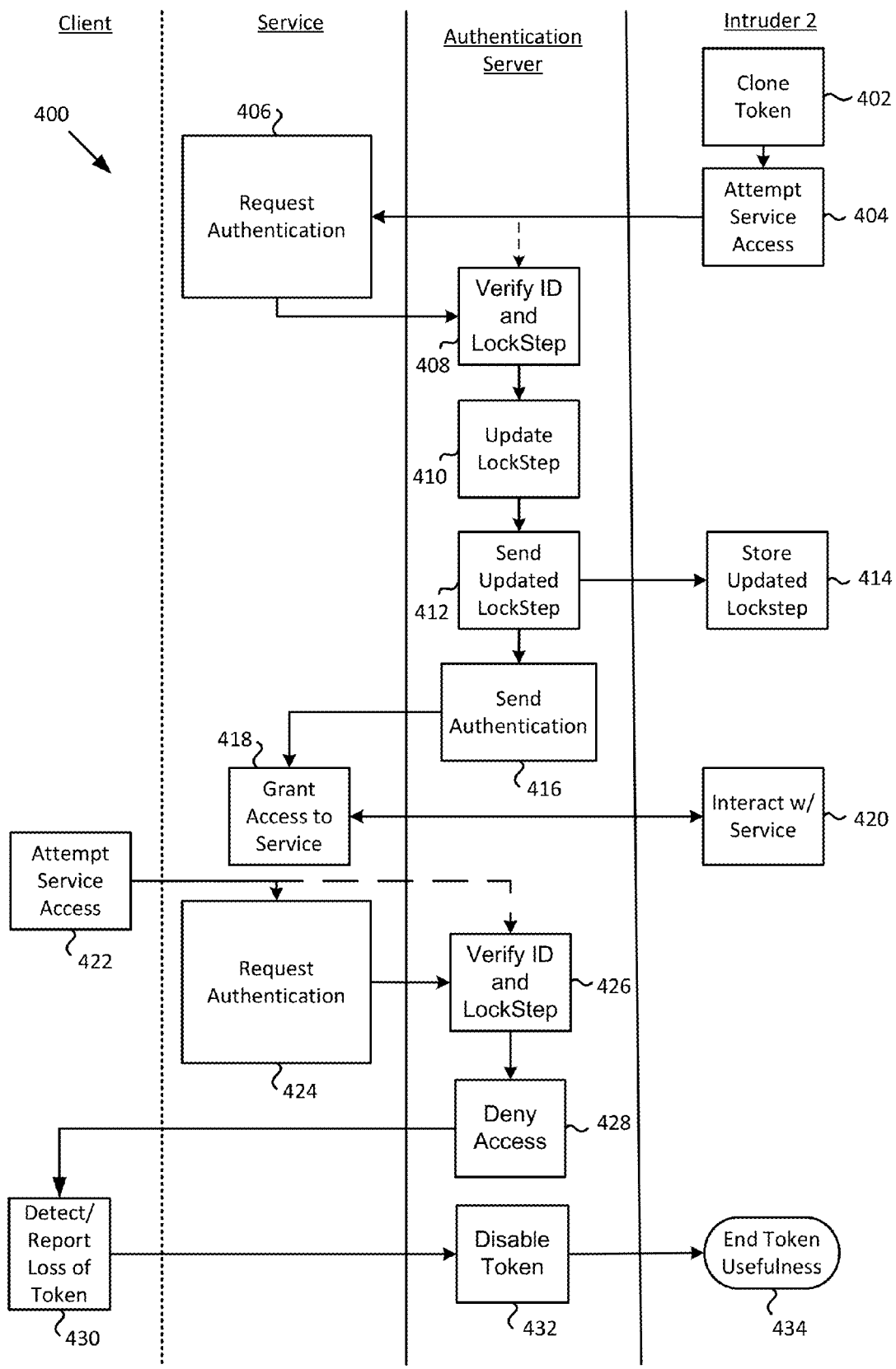
FIGS. 4A and 4B illustrate exemplary methods relating to cloned tokens, which methods may be employed in the environment of FIG. 1.
Figure 4B:
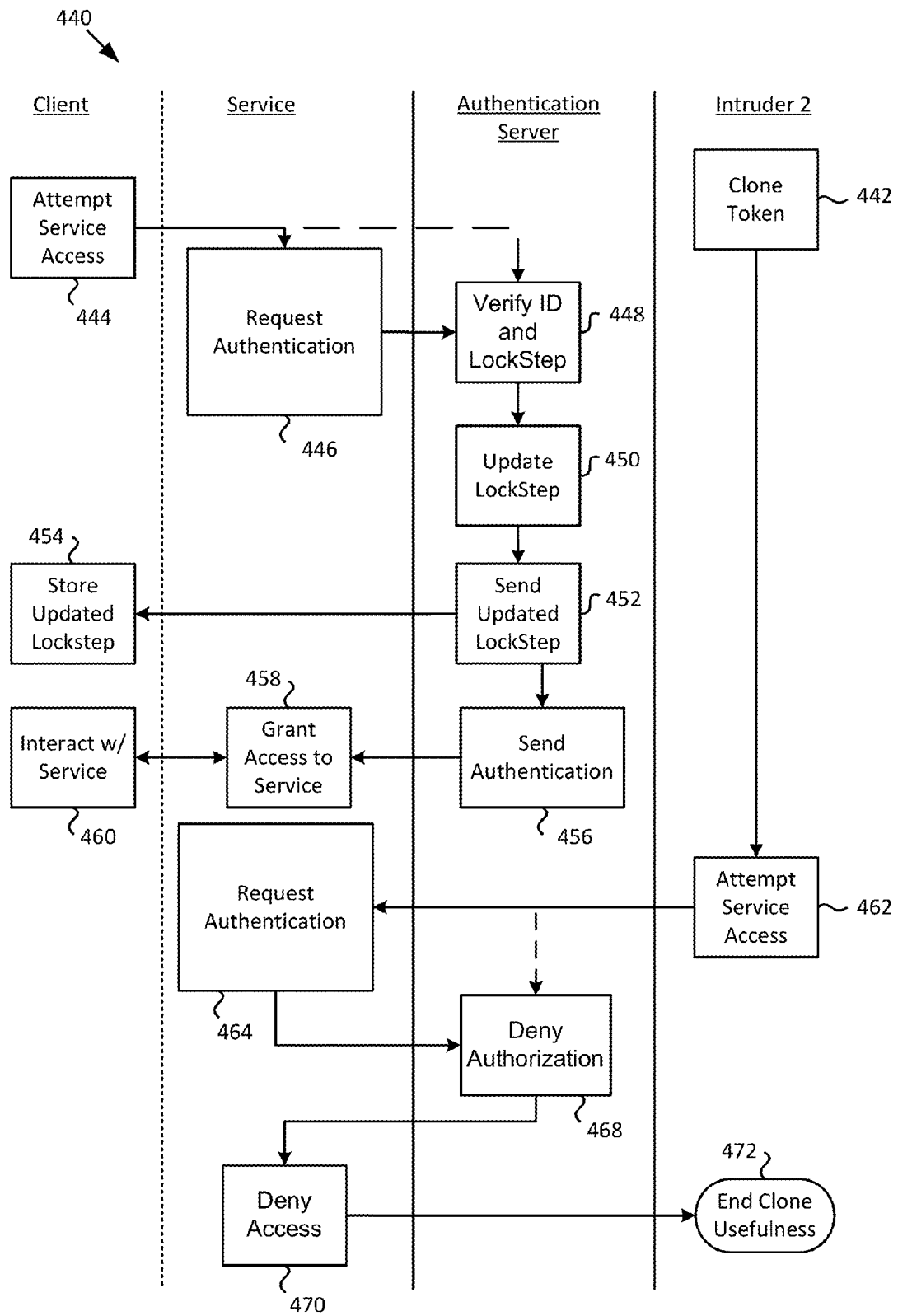

FIG. 4A illustrates a first exemplary method 400 relating to a cloned token. In this method, an intruder, such as the intruder 114-2 of FIG. 1, clones the client's token at block 402. Using the cloned token, which may be the cloned token 118 of FIG. 1, the intruder attempts to access the service at block 404. At block 406 the service requests authentication from the authentication server. The request includes the client ID and lockstep code from the token. The authentication server verifies the client ID and lockstep code at block 408 and updates the lockstep code at block 410. The authentication server sends the new confirmation lockstep code to the intruder at block 412, and the intruder stores the new confirmation lockstep code on the token at block 414. At block 416 the authentication server sends an approval message to the service, which grants access to the intruder at block 418. Thereafter, the intruder is able to interact with the service, as indicated by block 420.

At block 422 the client attempts to access the service using the original token containing the prior lockstep code. Either the client or the service at block 424 requests verification from the authentication server. The request includes the client ID and the previous lockstep code. The authentication server attempts to verify the ID and lockstep code at block 426. Since the lockstep code has changed, the verification fails and the authentication server denies access by sending a deny access message at block 428. The denial of access triggers the client to report the token as compromised at block 430. Hence, at block 432 the token is disabled and the clone's usefulness is ended as indicated by block 434.

Although blocks 422 through 434 illustrate the client attempting to access the service after the cloned token has been used, a different intruder using a cloned token would experience a similar result. In other words, the intruder's successful use of the token to access the service renders all other tokens, including the original token, useless.

FIG. 4B illustrates a similar process in which the client is able to access the service before the intruder does using a cloned token. An intruder clones the token at block 442. In blocks 444 to 460, the client gains access to the service and an updated lockstep code is stored on the client's token. The steps are identical to those illustrated and described previously in FIG. 2. Thereafter, the intruder attempts to gain access to the service using the cloned token at block 462. The service sends an authentication request at block 464 and the request is denied at block 468. The service denies access to the intruder at block 470, and the cloned token's usefulness ends as illustrated by block 472.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A method of authenticating a client to a service via a network, comprising:
   receiving a client ID and a lockstep code at an authentication server as part of a verification request;
   at the authentication server, comparing the lockstep code in the verification request to a confirmation lockstep code relating to the client ID;
   sending an authentication message from the authentication server based on the comparison;
   generating a new confirmation lockstep code at the authentication server; and
   sending the new confirmation lockstep code to a client device associated with the verification request.

2. The method of claim 1, wherein the lockstep code in the verification request comprises a first lockstep code, the method further comprising:
   thereafter, at the authentication server, receiving a verification request that includes the client ID and the first lockstep code;
   at the authentication server, comparing the first lockstep code to the new confirmation lockstep code relating to the client ID; and
   sending an authentication message from the authentication server that indicates that the comparison of the first lockstep code to the new confirmation lockstep code failed.

3. The method of claim 1, further comprising, at the authentication server, updating a stored confirmation lockstep code relating to the client ID to match the new confirmation lockstep code if the lockstep code in the verification request matched the confirmation lockstep code relating to the client ID.

4. The method of claim 1, further comprising:
   updating a lockstep code stored at a token associated with the client device to match the new confirmation lockstep code in response to the client device receiving the new confirmation lockstep code; and
   the client device sending the client ID and the new confirmation lockstep code as part of a next verification request.

5. The method of claim 4, wherein the token comprises a physical device.

6. The method of claim 4, wherein the token comprises software installed on the client device.

7. The method of claim 1, wherein generating a new confirmation lockstep code at the authentication server comprises creating a hash of one or more elements from a group comprising:
   the client ID;
   a time stamp; and
   a secret word.

8. The method of claim 1, wherein a length of the lockstep code is fixed.

9. The method of claim 1, wherein generating a new confirmation lockstep code comprises randomly generating the new confirmation lockstep code.

10. An authentication server, which:
    stores records relating to client IDs, each record comprises the client ID and either a confirmation lockstep code relating to the client ID or sufficient information to generate the confirmation lockstep code relating to the client ID;
    compares a lockstep code associated with a particular client ID in a verification request to a confirmation lockstep code associated with the particular client ID in the records;
    generates a new confirmation lockstep code associated with the particular client ID in the verification request if the comparison of the lockstep code in the verification request matches the confirmation lockstep code in the records associated with the particular client ID; and
    provides an authentication message based on the comparison.

11. The authentication server of claim 10, wherein the authentication server sends the new confirmation lockstep code to a client device associated with the verification request if the comparison of the lockstep code in the verification request matches the confirmation lockstep code in the records associated with the particular client ID.

12. The authentication server of claim 10, wherein the record for a client ID includes the confirmation lockstep code relating to the client ID.

13. The authentication server of claim 10, wherein the record for a client ID includes sufficient information to generate the confirmation lockstep code relating to the client ID.

14. The authentication server of claim 10, wherein the lockstep code in the verification request comprises a first lockstep code, the authentication server:
    receives a subsequent verification request that includes the client ID, the subsequent verification request comprises the first lockstep code;
    compares the first lockstep code in the subsequent verification request to the new confirmation lockstep code relating to the client ID in the records in response to receiving the subsequent verification request; and sends an authentication message that indicates that the comparison failed.

15. The authentication server of claim 10, wherein a length of the lockstep code is fixed.

16. A method of authenticating a client to a service via a network, comprising:
   receiving verification request at an authentication server, the verification request comprises an ID associated with an individual and a lockstep code;
   locating a record accessible to the authentication server relating to the individual in response to the verification request, the record comprises the ID and either a confirmation lockstep code relating to the individual or sufficient information to generate the confirmation lockstep code relating to the individual;
   at the authentication server, comparing the lockstep code in the verification request to the confirmation lockstep code relating to the ID associated with the individual;
   sending an authentication message from the authentication server based on results of the comparison;
   generating a new confirmation lockstep code at the authentication server if the lockstep code in the verification request matches the confirmation lockstep code relating to the ID associated with the individual;
   sending the new confirmation lockstep code to a client device associated with the verification request.

17. The method of claim 16, further comprising:
   receiving a subsequent verification request that includes the ID and the first lockstep code at the authentication server;
   comparing the first lockstep code in the subsequent verification request to the new confirmation lockstep code relating to the ID; and
   sending an authentication message from the authentication server that indicates that the comparison of the first lockstep code in the subsequent verification request to the new confirmation lockstep code relating to the ID failed.

18. The method of claim 16, wherein generating a new confirmation lockstep code at the authentication server comprises creating a hash of one or more elements.

19. The method of claim 16, wherein a length of the lockstep code is fixed.

20. The method of claim 16, wherein generating a new confirmation lockstep code comprises randomly generating a new confirmation lockstep code.

\* \* \* \* \*